US012467604B1

(12) United States Patent
Li et al.

(10) Patent No.: US 12,467,604 B1
(45) Date of Patent: Nov. 11, 2025

(54) LED LINEAR LIGHTS CAPABLE OF EMITTING LIGHT ON BOTH SIDES

(71) Applicant: Sundopt LED Lighting Co., Ltd., Shenzhen (CN)

(72) Inventors: Guoxin Li, Shenzhen (CN); Jin Hou, Shenzhen (CN); Pengfei Zhou, Shenzhen (CN); Weiyue Yu, Shenzhen (CN)

(73) Assignee: Sundopt LED Lighting Co., Ltd., Shenzhen (CN)

(*) Notice: Subject to any disclaimer, the term of this patent is extended or adjusted under 35 U.S.C. 154(b) by 0 days.

(21) Appl. No.: 19/014,343

(22) Filed: Jan. 9, 2025

(30) Foreign Application Priority Data

Oct. 9, 2024 (CN) ......................... 202411401769.4

(51) Int. Cl.

| | |
|---|---|
| ***F21V 17/06*** | (2006.01) |
| ***F21V 15/01*** | (2006.01) |
| ***F21V 19/00*** | (2006.01) |
| ***F21V 23/00*** | (2015.01) |
| ***F21V 23/02*** | (2006.01) |
| ***F21V 31/00*** | (2006.01) |
| ***F21Y 115/10*** | (2016.01) |

(52) U.S. Cl.
CPC .............. *F21V 17/06* (2013.01); *F21V 15/01* (2013.01); *F21V 19/004* (2013.01); *F21V 23/009* (2013.01); *F21V 23/023* (2013.01); *F21V 31/005* (2013.01); *F21Y 2115/10* (2016.08)

(58) Field of Classification Search
CPC ........ F21V 17/06; F21V 15/01; F21V 19/004; F21V 23/009; F21V 23/023; F21V 31/005; F21Y 2115/10
See application file for complete search history.

(56) References Cited

U.S. PATENT DOCUMENTS

| | | | | |
|---|---|---|---|---|
| 11,211,040 B2 * | 12/2021 | Czech | .................. | G10K 11/162 |
| 11,869,474 B2 * | 1/2024 | Simla | ......................... | F21S 4/28 |
| 12,203,633 B1 * | 1/2025 | Fan | ....................... | F21V 21/096 |

(Continued)

FOREIGN PATENT DOCUMENTS

| | | |
|---|---|---|
| CN | 209655132 U | 11/2019 |
| CN | 218914741 U | 4/2023 |

(Continued)

*Primary Examiner* — Tsion Tumebo

(74) *Attorney, Agent, or Firm* — Hawaii Patent Services; Nathaniel K. Fedde; Kenton N. Fedde

(57) ABSTRACT

A LED linear light, wherein the LED linear light capable of emitting light on both sides comprises a light housing with openings at both ends along a first direction; a first light-emitting unit is detachably connected to an opening of one end of the light housing, and a second light-emitting unit is installed on an opening of the other end of the light housing; the second light-emitting unit comprises a light-emitting member and a lampshade sequentially arranged in a direction away from the opening of the other end of the light housing; the light-emitting member comprises two hook-shaped portions extending outside the light housing; sealing grooves are formed on outer wall surfaces of the hook-shaped portions; lower edges of the light housing are in contact with walls of the sealing grooves; and inner wall surfaces of the hook-shaped portions extend inward to form clamping portions.

10 Claims, 9 Drawing Sheets

(56) References Cited

U.S. PATENT DOCUMENTS

| | | | | |
|---|---|---|---|---|
| 2015/0292719 | A1* | 10/2015 | Park | F21S 8/026<br>362/217.05 |
| 2018/0334804 | A1* | 11/2018 | Patterson | F21V 21/008 |
| 2019/0309917 | A1* | 10/2019 | Santos | F21V 7/005 |
| 2021/0048152 | A1* | 2/2021 | Parker | F21V 7/0016 |
| 2021/0116080 | A1* | 4/2021 | Tan | F21S 4/28 |

FOREIGN PATENT DOCUMENTS

| | | | |
|---|---|---|---|
| CN | 220540951 | U | 2/2024 |
| KR | 20160105138 | A | 9/2016 |

* cited by examiner

LED LINEAR LIGHTS CAPABLE OF EMITTING LIGHT ON BOTH SIDES

INCORPORATION BY REFERENCE

This application claims the benefit of priority from China Patent Application No. 2024114017694 filed on Oct. 9, 2024, the contents of which are hereby incorporated by reference in their entirety.

TECHNICAL FIELD

The present invention relates to the technical field of LED linear lights, in particular to a LED linear light capable of emitting light on both sides.

BACKGROUND TECHNOLOGY

LED linear lights have different lighting requirements in different application scenarios. For example, when the light of the store needs to focus on illuminating the goods on the shelves, so a flat lampshade is selected, which has a wider light distribution, a larger lighting range, and a higher overall brightness. In a general working environment, a LED linear lamp capable of emitting light on both sides is selected to provide a certain range of light, which has a certain soothing function and can reduce the stimulation of light to the eyes and protect the eyes. In office areas (such as design studios or drawing rooms) where there are many computer screens, a grille lampshade is selected to better control the distribution and direction of light, reduce glare, reduce reflection, and reduce screen reflection. It can be seen that the design of existing lamps on the market can only meet the application of a single environment. If the light needs to be changed after the lamp is installed, a new lamp must be purchased, resulting in a waste of resources.

The LED linear lights in the prior art mainly comprise lamps and lampshades. The lampshades and the lamps are connected by buckles. In conventional solutions, the lampshades and lamps can be installed by simply snapping the two buckles together. However, a certain amount of elastic margins must be left between the buckles to allow for the buckles to deform, otherwise the buckle blocks are prone to breakage. It is understandable that as the elastic margins increase, gaps between the lampshades and the lamps become larger, which means the light leakage is more serious and the light utilization rate is lower. For those skilled in the art, if the light utilization rate is to be increased, means that can be used usually comprise making the connections between the lampshades and the lamps tighter, which means that the elastic margins between the buckles are smaller, causing the buckle blocks to break more easily.

It can be seen that the LED linear lights in the prior art still has the problem that when the lamps and the lampshades are connected by buckles, enough elastic margins are provided between the buckles for the buckles to deform, and at the same time, light leakage cannot be avoided to ensure the light utilization rate.

SUMMARY OF INVENTION

A purpose of the present invention is to provide a LED linear light capable of emitting light on both sides, which ensures that there are sufficient elastic margins between buckles to increase the service life, and effectively avoids light leakage to ensure light utilization.

To achieve the purpose above, the present invention is implemented through following technical solutions:

a LED linear light capable of emitting light on both sides is designed; the LED linear light capable of emitting light on both sides comprises a light housing with openings at both ends along a first direction; a first light-emitting unit is detachably connected to an opening of one end of the light housing, and a second light-emitting unit is installed on an opening of the other end of the light housing;

the second light-emitting unit comprises a light-emitting member and a lampshade sequentially arranged in a direction away from the opening of the other end of the light housing; the light-emitting member comprises two hook-shaped portions extending outside the light housing; sealing grooves are formed on outer wall surfaces of the hook-shaped portions; lower edges of the light housing are in contact with walls of the sealing grooves; inner wall surfaces of the hook-shaped portions extend inward to form clamping portions; and the lampshade comprises clamping grooves corresponding to the clamping portions; a width of the clamping grooves is greater than a width of the clamping portions; L-shaped inner end covers are installed at both ends of the light housing along a second direction, and the inner end covers are slidably connected to the light housing along the first direction, so that a cover body of the lampshade can move in a direction close to the light housing and abuts against the clamping portions.

Optionally, the light-emitting member comprises a housing and a LED light board; the housing is detachably connected to the light housing through quick release mechanisms; an end surface of the housing is detachably connected to the LED light board through slide grooves; and the hook-shaped portions are provided on the housing; and magnets are disposed between the inner end covers and inner end surfaces of the light housing; the ends of the inner end covers are in contact with a surface of the lampshade; bending parts of the inner end covers contact end surfaces of the lampshade and the housing.

Optionally, support blocks are provided at positions of the lampshade corresponding to the clamping portions; U-shaped blocks are provided at ends of the support blocks; sealing portions of the U-shaped blocks protrude from the support blocks to form the clamping grooves for the clamping portions to be clamped in; openings of the U-shaped blocks are arranged inwardly; each U-shaped block is composed of two guiding inclined panels; combinations of the two guiding inclined panels are arranged in arc-shaped surfaces; one of the guiding inclined panels and the lampshade form a clamping groove; and the other guiding inclined panel is used to guide a hook-shaped portion to slide into the clamping groove.

Optionally, the quick release mechanisms comprise insulating pads, rotating shafts, rotating brackets, springs, baffles, locking bolts and two abutment plates; a surface of the housing is provided with protrusions, and end surfaces of the protrusions are slidably connected to the insulating pads through the slide grooves opened along the second direction; a plurality of convex grooves extending along the second direction are provided on inner side walls of the slide grooves; the insulating pads are spaced apart from the surface of the housing; the insulating pads are arranged at intervals on the surface of the housing; concave patterns matching the convex patterns are provided on the insulating pads; the LED light board, the surface of the housing and bottom surfaces of the insulating pads are all provided with circular through-holes; ends of the rotating shafts pass through the circular through-holes provided on the LED light board, the housing and the insulating pads, and are rotatably connected with the LED light board, the housing and the insulating pads, and the other ends of the rotating shafts at least partially abut against a surface of the LED light board;

cross sections of the rotating shafts are waist-shaped; bottom surfaces of the rotating brackets and surfaces of the baffles are both slidably connected to surfaces of the rotating shafts through waist-shaped holes; the springs are sleeved on outside portions of the rotating shafts and ends of the springs abut against the bottom surfaces of the rotating brackets; the other ends of the springs abut against the baffles; end surfaces of the rotating shafts passing through the baffles are threadedly connected to the locking bolts through threaded holes, and the locking bolts at least partially abut against the baffles; and two abutment plates are fixedly connected to the two ends of the rotating brackets; two support plates are fixedly connected to an inner side wall of the light housing; the two abutment plates abut against upper surfaces of the two support plates, respectively.

Optionally, both ends of the rotating brackets are arranged to be inclined along the first direction; the two abutment plates are both arranged in a V-shape on upper edges of the both ends of the rotating brackets; and V-shaped bottom surfaces of the two abutment plates are respectively in contact with the upper surfaces of the two support plates.

Optionally, there are two quick release mechanisms; the two quick release mechanisms are symmetrically arranged on the housing; the abutment plates and the rotating brackets are both made of conductive metal; at least one first contact and at least one second contact are respectively provided on the upper surfaces of the two support plates; and the two abutment plates on one of the quick release mechanism correspond to the at least one first contact and the at least one second contact, so that the at least one first contact and the at least one second contact are connected.

Optionally, at least one control assembly is detachably connected with one end of the light housing, and the at least one control assembly covers the opening at one end of the light housing; at least one electromagnet is provided on the at least one control assembly, and the at least one first contact and the at least one second contact are connected in series in a circuit of the at least one electromagnet; a fixing end of the first light-emitting unit is made of magnetic material; and the fixing end of the first light-emitting unit is detachably connected to a surface of the control assembly through the at least one electromagnet.

Optionally, the at least one control assembly comprises at least one mounting plate, at least one power supply and at least one control module; one end of the light housing is mounted on an outer surface of the at least one mounting plate through grooves; the at least one electromagnet is fixedly connected to an surface of the at least one mounting plate; the at least one electromagnet is electrically connected to the at least one power supply; the at least one first contact and the at least one second contact are connected in series with a connection between the at least one electromagnet and the at least one power supply; the at least one control module is electrically connected to the at least one power supply; and an input end of a light-emitting end of the first light-emitting unit and an input end of the LED light board are both electrically connected to an output end of the at least one control module.

Optionally, plug blocks are provided at a bottom portion of the at least one mounting plate; and locking holes cooperating with the plug blocks are provided on the surfaces of the baffles.

Optionally, the lampshade comprises a grille plate and light-collecting shells; escape openings are provided with a surface of the grille plate; ends of the light-collecting shells are fixedly connected to the surface of the grille plate and are located in the housing; a diameter of openings of the ends of the light-collecting shells located in the housing is smaller than a diameter of openings of ends shielding the escape openings; a side surface of the grille plate is slidably connected to one end of the housing along the first direction; light beads arranged on the LED light board correspond to the light-collecting shells; the openings of the ends of the light-collecting shells located in the housing extend to outside of the light beads; and operation openings corresponding to the rotating shafts are provided on the surface of the grille plate.

The present invention provides a LED linear light capable of emitting light on both sides, which has following beneficial effects:

According to the LED linear light capable of emitting light on both sides provided by the present invention, when installing the lampshade, the light-emitting member is pre-embedded into the light housing, and then the lampshade is embedded, and finally the inner end covers are slid in the direction close to the light housing to complete the installation of the lampshade. During the embedding process of the lampshade, the edges of the lamping grooves can push the clamping portions outward, so that the clamping portions are clamped into the lamping grooves to complete the installation of the lampshade. At this time, the width of the clamping grooves is greater than the width of the clamping portions, which means that the lamping grooves will only be subjected to deformation forces during the clamping process, thereby ensuring the service life of the clamping portions; then, during a process of the inner end covers pushing the lampshade, the clamping grooves on the lampshade synchronously pushes the clamping portions, and then acts on the hook-shaped portions, so that the hook-shaped portions are deformed in a direction of the light housing, which means that the walls of the sealing grooves are also deformed synchronously, so that the lower edges of the light housing can fit tightly with the walls of the sealing grooves, which is equivalent to wrapping the lower edges of the light housing, thereby reducing light leakage of the LED linear light and further improving light utilization rate. It can be understood that for the hook-shaped portions, force directions in the above two processes are not the same. During the embedding process of the lampshade, the hook-shaped portions expand outward, which is mainly tensile deformations; while in the process of the inner end covers pushing the lampshade, the hook-shaped portions are deformed toward the light housing, which is mainly compressive deformations; compressive strength of plastics is greater than tensile strength, thereby improving overall life.

Figure 1:
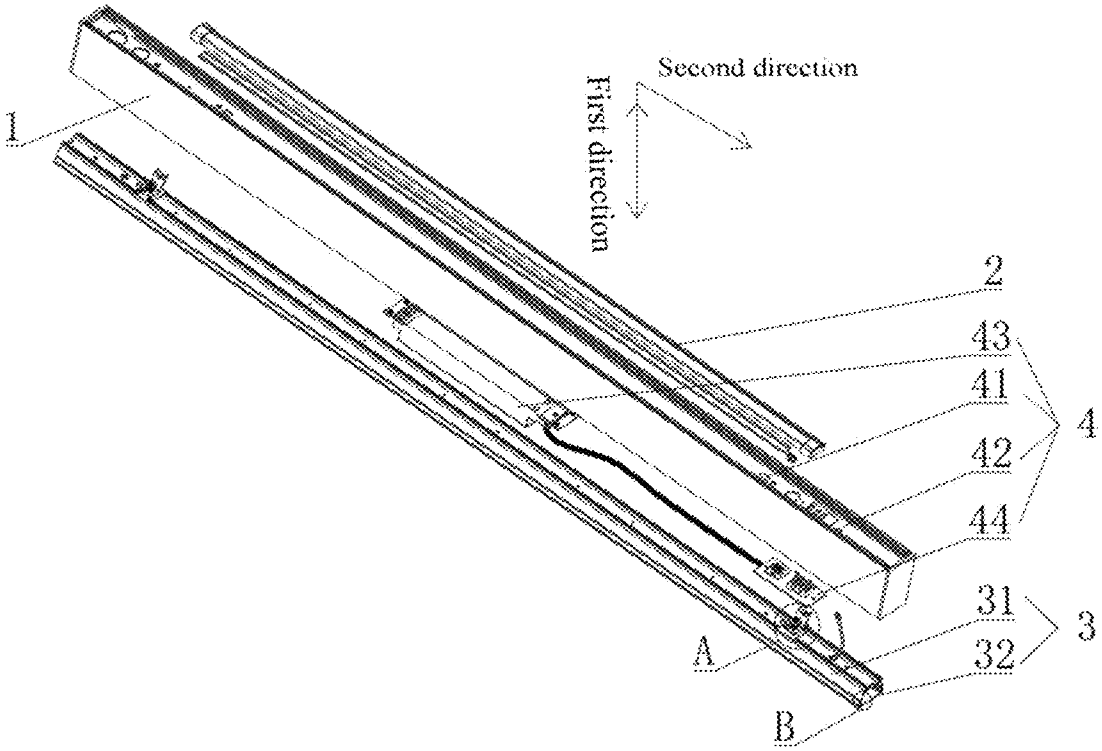
FIG. 1 is a schematic diagram of an explosion structure of LED linear lights capable of emitting light on both sides in the present invention.
Figure 2:
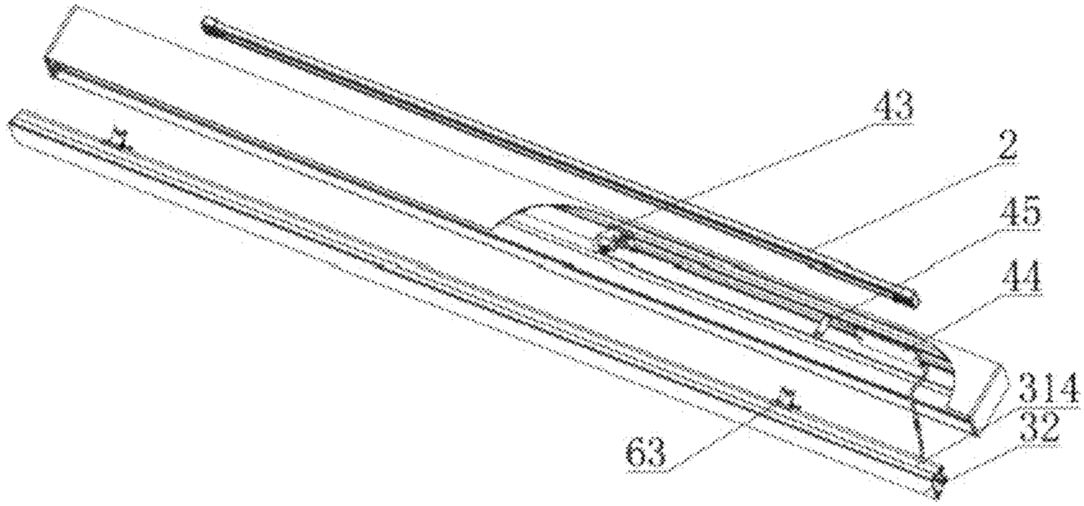
FIG. 2 is a schematic sectional view of the LED linear lights capable of emitting light on both sides in the present invention.
Figure 3:
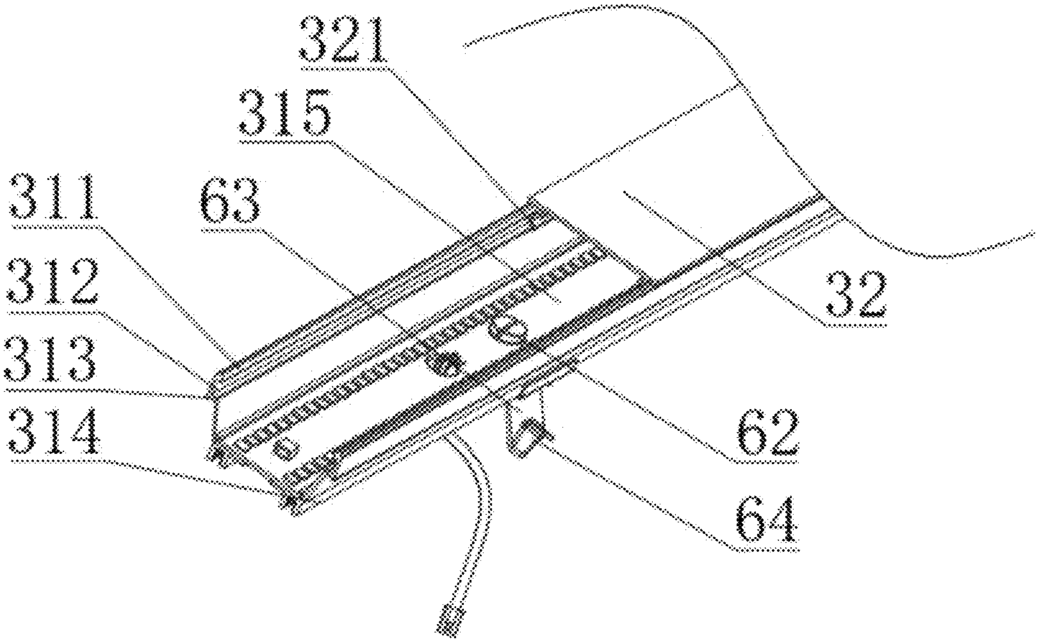
FIG. 3 is a schematic diagram of a three-dimensional structure of a second light-emitting unit in the present invention.
Figure 4:
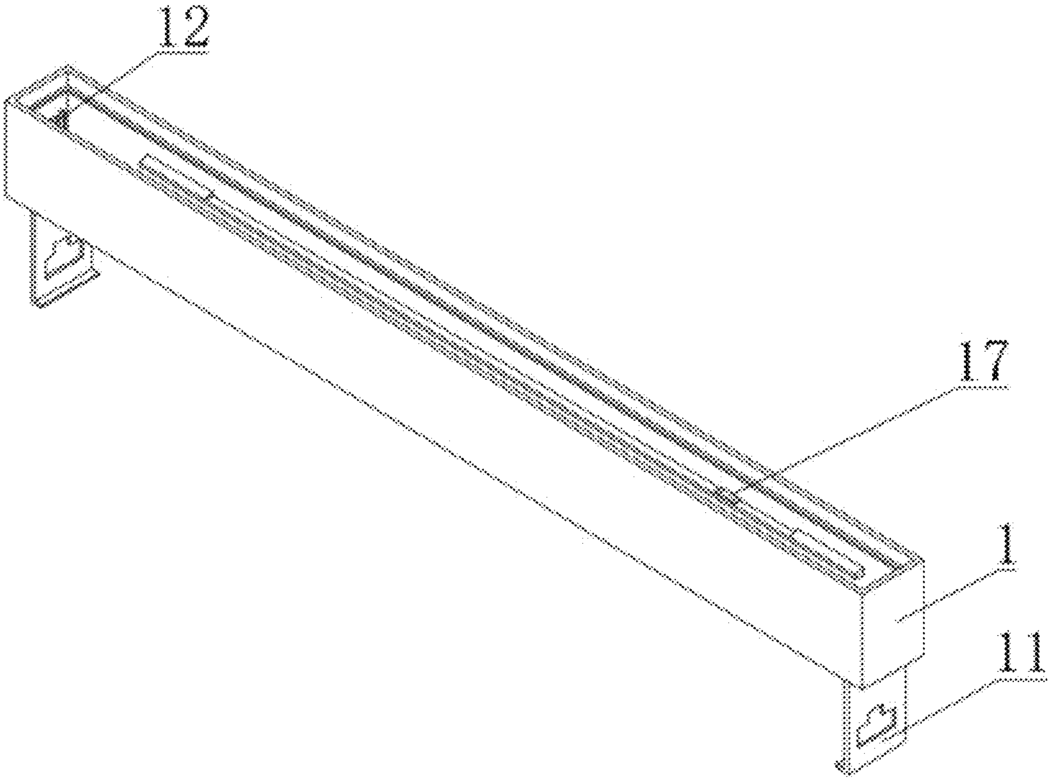
FIG. 4 is a schematic view of a three-dimensional structure of a light housing in the present invention.
Figure 5:
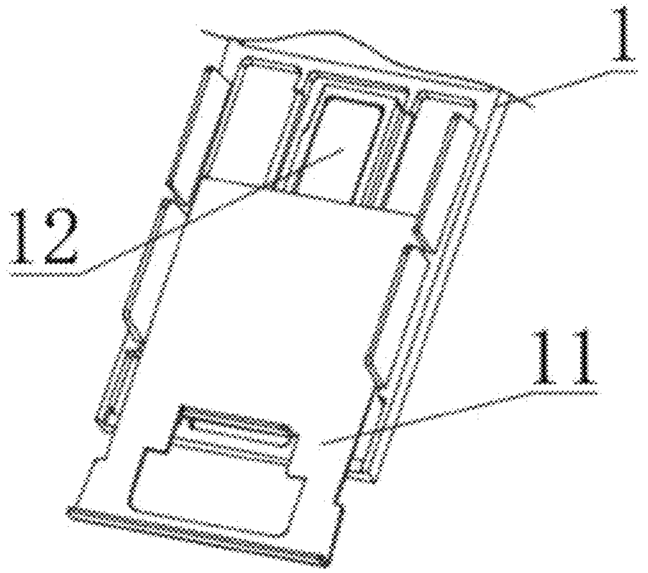
FIG. 5 is a schematic view of the three-dimensional structure of an inner end cover in the present invention.
Figure 6:
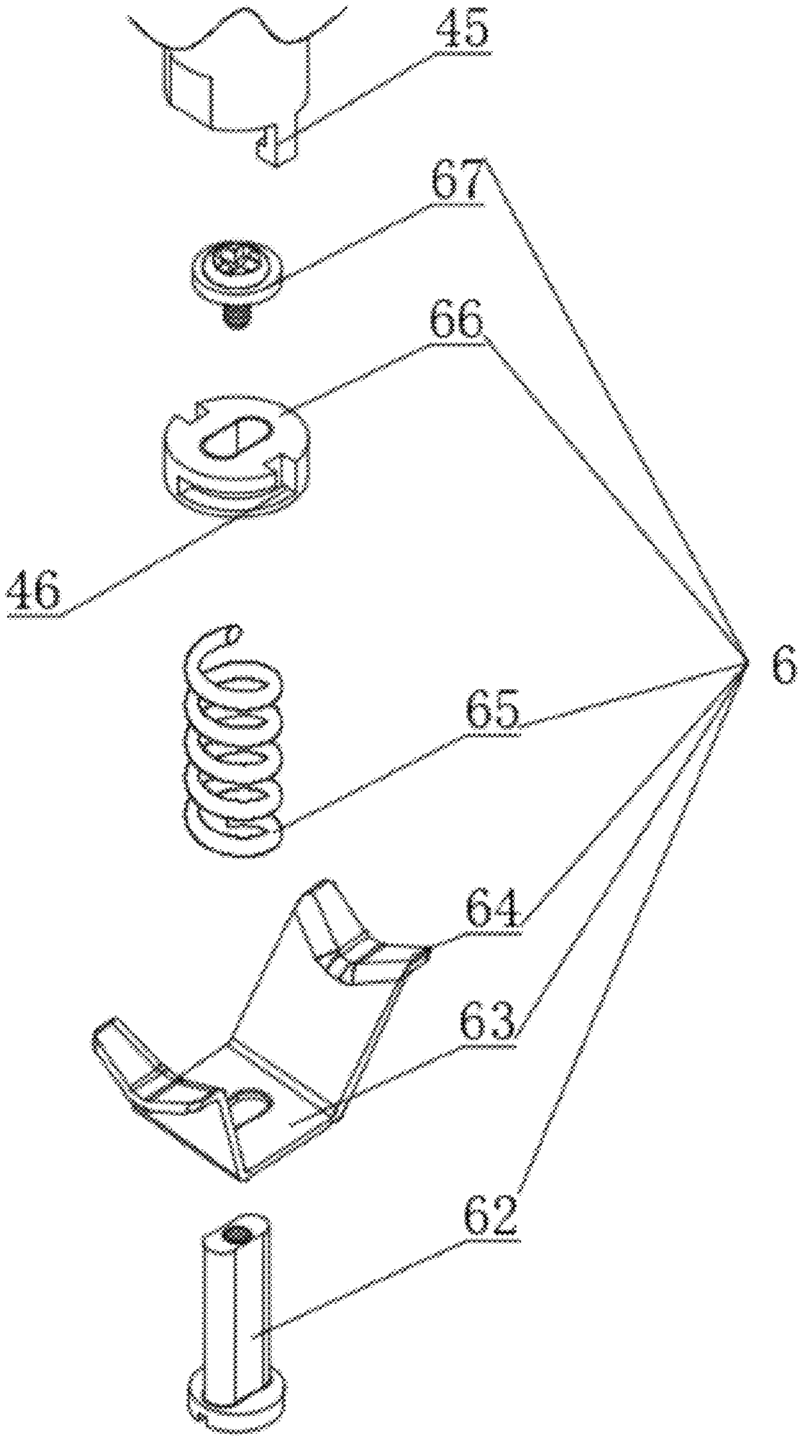
FIG. 6 is a schematic diagram of an explosion structure of a quick release mechanism in the present invention.
Figure 7:
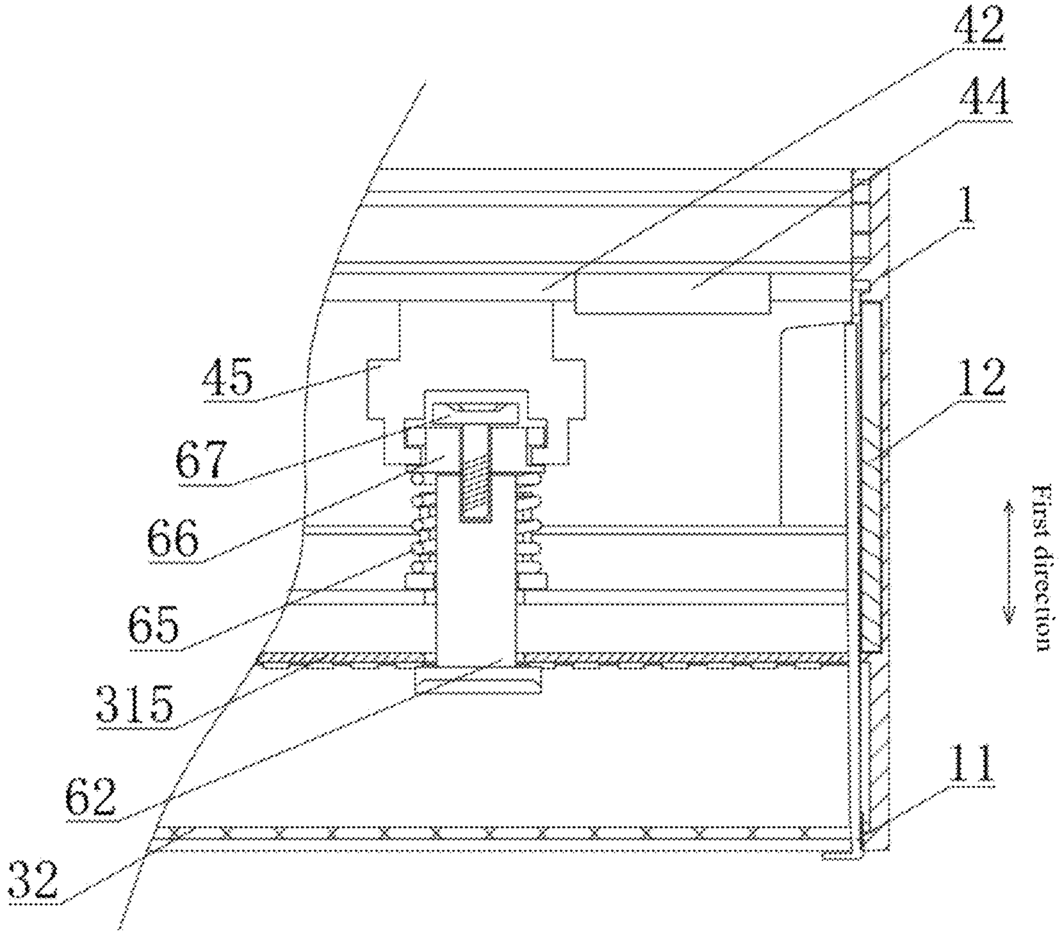
FIG. 7 is a schematic view of a side sectional plane structure of the light housing in the present invention.
Figure 8:
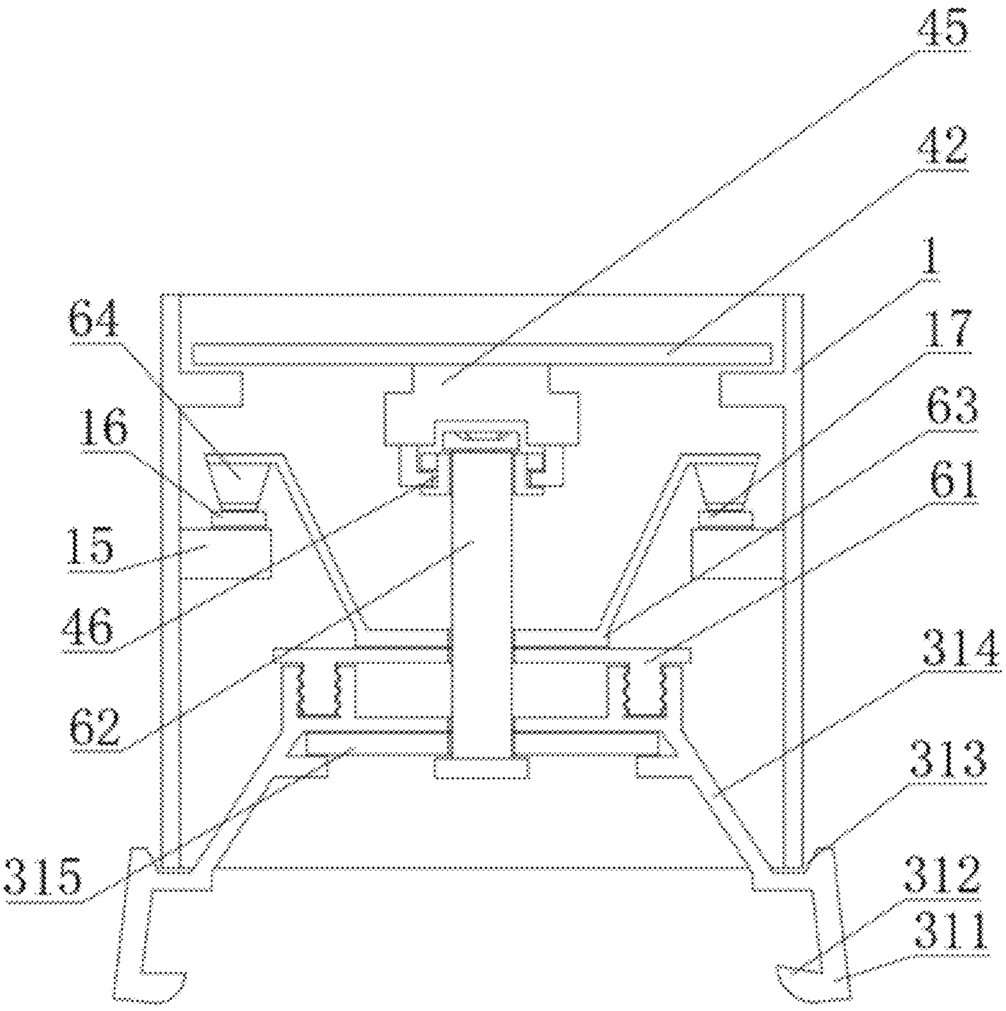
FIG. 8 is a schematic view of a front sectional plane structure of the light housing in the present invention.
Figure 9:
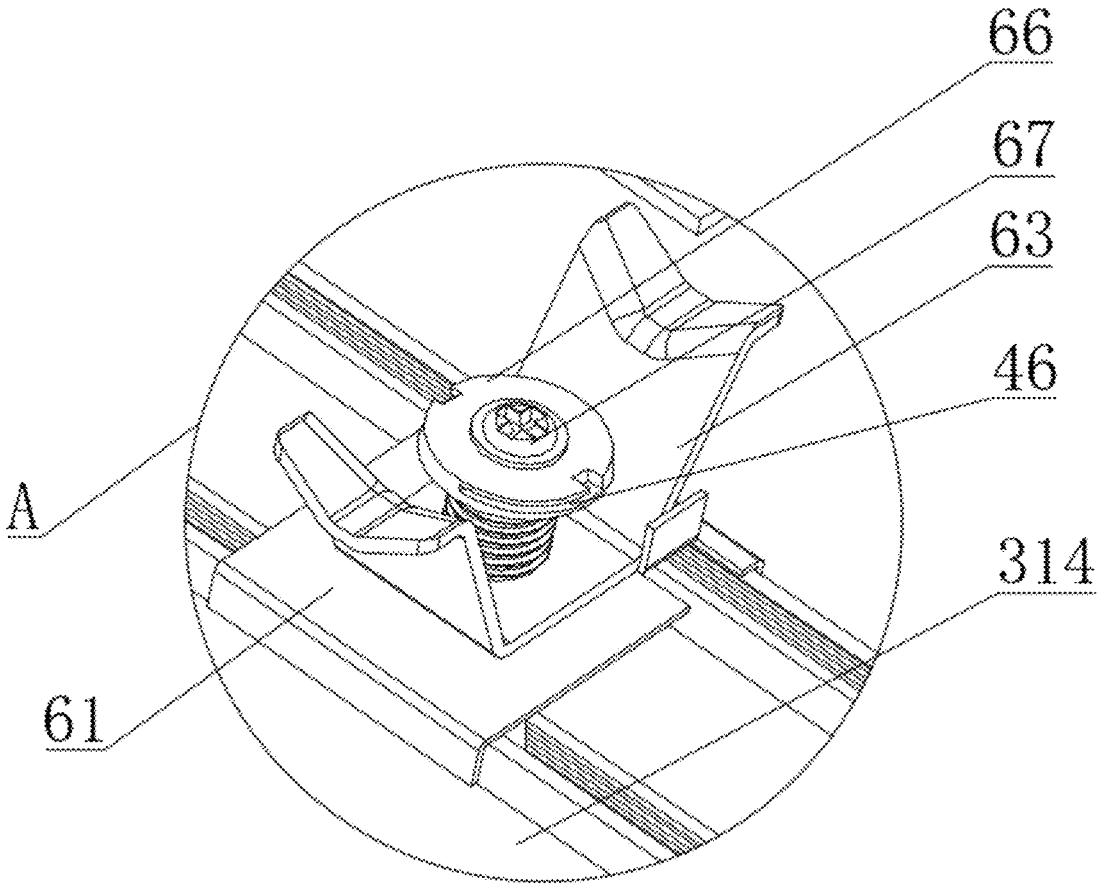
FIG. 9 is an enlarged schematic view of the structure at the area "A" in FIG. 1.
Figure 10:
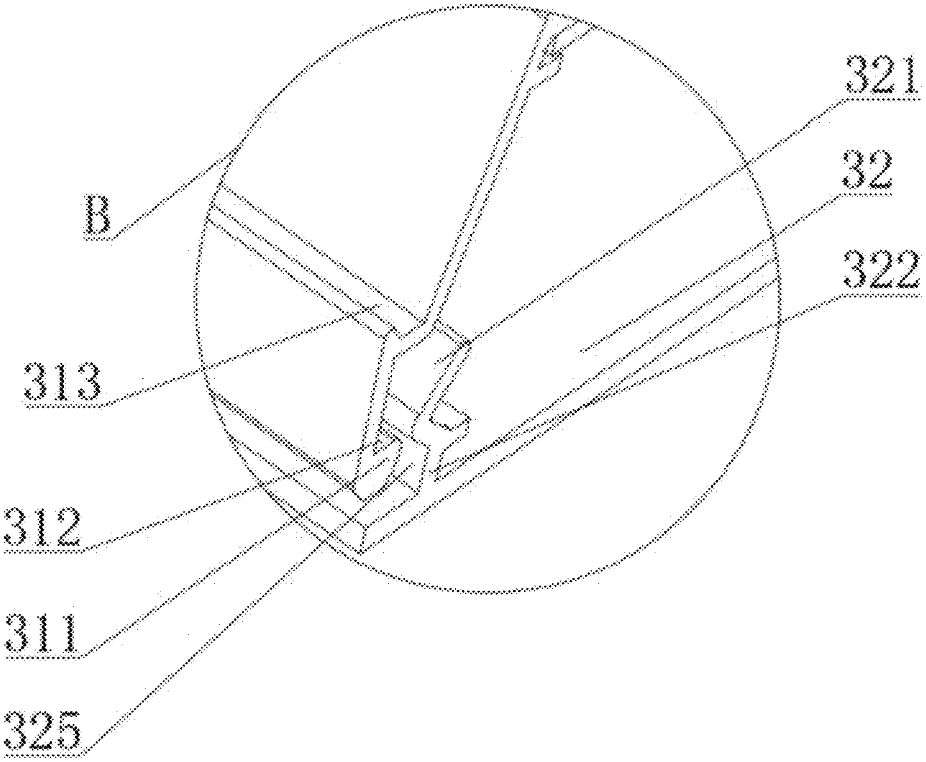
FIG. 10 is an enlarged schematic view of the structure at the area "B" in FIG. 1.

In the drawings: 1, light housing; 11, inner end cover; 12, magnet; 15, support plate; 16, first contact; 17, second contact; 2, first light-emitting unit; 3, second light-emitting unit; 31, light-emitting member; 311, hook-shaped portion; 312, clamping portion; 313, sealing groove; 314, housing; 315, LED light board; 32, lampshade; 321, guide inclined plate; 322, support block; 323, grille plate; 324, light-collecting shell; 325, clamping groove; 4, control assembly; 41, electromagnet; 42, mounting plate; 43, power supply; 44, control module; 45, plug block; 46, locking hole; 6, quick release mechanism; 61, insulating pad; 62, rotating shaft; 63, rotating bracket; 64, abutment plate; 65, spring; 66, baffle; and 67, locking bolt.

EMBODIMENTS

In the following, the technical solutions in the embodiments of the present invention will be clearly and completely described in combination with the attached drawings. Based on the embodiments of the present invention, all other embodiments obtained by those of ordinary skills in the art without creative labor belong to the scope of protection of the present invention.

Embodiment 1

Referring to FIGS. 1 to 10, the present invention provides a technical solution: a LED linear light capable of emitting light on both sides, comprising a light housing 1 with openings at both ends along a first direction; a first light-emitting unit 2 is detachably connected to an opening of one end of the light housing 1, and a second light-emitting unit 3 is installed on an opening of the other end of the light housing 1;

the second light-emitting unit 3 comprises a light-emitting member 31 and a lampshade 32 which are sequentially arranged in a direction away from the other end opening; the light-emitting member 31 comprises two hook-shaped portions 311 extending outside the light housing 1; sealing grooves 313 are formed on outer wall surfaces of the hook-shaped portions 311; lower edges of the light housing 1 are in contact with walls of the sealing grooves 313; inner wall surfaces of the hook-shaped portions 311 extend inward to form clamping portions 312;

the lampshade 32 comprises clamping grooves 325 corresponding to the clamping portions 312; a width of the clamping grooves 325 is greater than a width of the clamping portions 312; L-shaped inner end covers 11 are installed at both ends of the light housing 1 along a second direction, and the inner end covers 11 are slidably connected to the light housing 1 along the first direction, so that a cover body of the lampshade 32 can move in a direction close to the light housing 1 and abuts against the clamping portions 312;

the width of the clamping grooves 325 is greater than the width of the clamping portions 312; in the present embodiment, the width of the clamping grooves 325 is a length along the first direction;

the light housing 1 is a hollow shell structure with the openings at both ends along the first direction, serving as a structural frame of the entire lamp for accommodating and supporting the light-emitting units; wherein at least one ventilation unit and at least one unit for controlling light switches can also be provided; the at least one ventilation unit can be provided to assist heat dissipation of the first light emitting unit 2 and the second light emitting unit 3, and the at least one switch unit is used to control the first light emitting unit 2 and the second light emitting unit 3 to open; design of the openings at both ends facilitates installation and removal of the light-emitting units, facilitates maintenance, and reduces space occupied by the first light-emitting unit 2 and the second light-emitting unit 3; at the same time, the first light emitting unit 2 and the second light emitting unit 3 are stored in the light housing 1, which does not affect transmission of light of the first light emitting unit 2 and the second light emitting unit 3, and can also protect the first light emitting unit 2 and the second light emitting unit 3, thereby preventing users from accidentally touching ends of the first light emitting unit 2 and the second light emitting unit 3, causing connections with the at least one switch unit to become loose or have poor contact, and also preventing users from touching electrical connection parts to cause safety hazards; a fixed end of the first light-emitting unit 2 is detachably connected to one end of the light housing 1 along the first direction, providing a light source for the end of the light housing 1; detachable light-emitting units are convenient for replacement and maintenance, thereby improving service life and flexibility of the light; the light-emitting member 31 and the lampshade 32 provide a light source in another direction, realizing double-sided lighting; double-sided lighting can improve comfort of an office environment for people and avoid situation where only the table is bright while the surrounding is dark, which affects mood of people; different lampshades 32 can be used to bring different effects to the light; for example, a flat LED lampshade has a wider light distribution, a larger lighting range, and generally higher overall brightness; the flat LED lampshade has a simple design and is easy to clean and maintain, and suitable for large open office areas that require bright and even lighting; for another example, a grille-type LED lampshade can better control the light distribution and direction, reduce glare and reflection; the grille-type LED lampshade is suitable for areas that require precise lighting control, such as design studios or drawing rooms, and office areas with many computer screens to reduce screen reflection;

by installed and used at the same time in an office environment, the first light-emitting unit 2 and the second light-emitting unit 3 provides a certain soothing function and also have a more uniform and extensive lighting effect, which is suitable for places such as shopping malls, offices, exhibition halls, etc. that require large-area lighting; the inner end covers 11 can also assist in positioning the lampshade 32, effectively improving stability of engagements; with clamping generated by magnets 12, the inner end covers 11 can be pulled to adjust according to thickness of the different lampshades replaces 32 while assisting in fixing the lampshades 32, thereby improving applicability, reducing number of parts used to fix the inner end covers 11 and number of steps for adjusting the inner end covers 11, and improving the efficiency of the replacements;

the first light-emitting unit 2 is a light bar and is a well-known technology in the prior art. It is only cited again and no further description is given. The purpose of the first light-emitting unit 2 is to cooperate with the second light-emitting unit 3 to realize double-sided light emission;

the fixed end of the light-emitting member 31 is detachably connected to the other end of the light housing 1 and covers the opening of the other end of the light housing 1 to ensure integrity and beauty of the structure; the lampshade 32 is detachably connected to an end of the light-emitting member 31 away from the light housing 1 to protect the light-emitting member 31 and adjust diffusion of light; the hook-shaped portions 311, the clamping portions 312 and the sealing grooves 313 are combined into clamping protrusions; the clamping protrusions are arranged on the light-emitting member 31; the light-emitting member 31 protrudes outward, and comprises the hook-shaped portions 311 bent inwardly; clamping portions 312 are formed at free ends of the hook-shaped portions 311; U-shaped blocks provided on the lampshade 32 corresponds to the clamping protrusions; the clamping protrusions cooperate with the clamping grooves 325 to achieve stable connections of the lampshade 32, ensuring that the lampshade is not easy to fall off and is easy to disassemble; the U-shaped blocks on upper edges of the clamping grooves 325 guide clamping protrusions (i.e. the hook-shaped portions 311) of the lampshade to slide smoothly into the clamping grooves 325; the U-shaped blocks play a guiding role during installation process, making it easier for the clamping protrusions to align with the clamping grooves 325, reducing difficulty of installation and facilitating alignment and engagement during assembly; the hook-shaped portions 311 of the clamping protrusions are tightly matched with inner walls of the clamping grooves 325, providing sufficient mechanical strength to ensure stability of the lampshade during use; the clamping protrusions and the U-shaped blocks make overall structure of the light more compact, without additional protruding parts, reducing space occupied; at the same time, the setting of the clamping protrusions and the U-shaped blocks also makes appearance of the light more simple and beautiful; tight fits between the clamping protrusions and the clamping grooves 325 can increase sealing of the lampshade 32, preventing dust and moisture from entering interiors of the light housing 1; and precise fits between the clamping protrusions and the clamping grooves 325 and supports of the U-shaped blocks can effectively reduce leakage of light from the connection parts, thereby improving light efficiency and lighting effect;

through connections between the inner end covers 11 and the magnets 12, the magnets 12 provide adsorption forces; the adsorption forces facilitate installation and removal of the inner end covers 11; at the same time, when the inner end covers 11 move along the first direction, adsorption forces can be generated to assist positioning of the inner end covers 11, while ensuring that the inner end covers 11 do not move during operation; the inner end covers 11 are made of metal, such as iron; ends of the inner end covers 11 contact a surface of the lampshade 32, and bending parts of the inner end covers 11 contact end surfaces of the lampshade 32 and the light-emitting member 31 for preventing light leakage and displacement of the light-emitting member 31; the L-shaped inner end covers 11 not only block light, but also act as limiters to ensure that the light-emitting member 31 and the lampshade 32 are in the correct position; the L-shaped inner end covers 11 also act as protectors to prevent the end surfaces of the lampshade 32 from being touched, causing the lampshade 32 to fall off from the light-emitting member 31; use of the magnets 12 make installation and removal of the inner end covers 11 more convenient, reduces use of parts, and reduces installation time; and magnetic forces of the magnet 12 are sufficient to lock the inner end covers 11, and can provide sufficient adsorption forces to lock the inner end covers 11 and the lampshade 32, while not affecting the inner end covers 11 sliding along the first direction to adjust positions.

Specific usage scenario of the present embodiment may be on a desk in an office. The light housing 1 in the present embodiment is installed above a desk surface and is located in front of the user.

In the present embodiment, as a preferred solution, the light-emitting member 31 comprises a housing 314 and an LED light board 315; the housing 314 is detachably connected to the light housing 1 through quick release mechanisms 6; an end surface of the housing 314 is detachably connected to the LED light board 315 through slide grooves; and the hook-shaped portions 311 are provided on the housing 314;

the magnets 12 are disposed between the inner end covers 11 and inner end surfaces of the light housing 1; the ends of the inner end covers 11 are in contact with the surface of the lampshade 32; the bending parts of the inner end covers 11 contact end surfaces of the lampshade 32 and the housing 314;

the quick-release mechanism 6 can be used to quickly remove the housing 314 from the light housing 1; the LED light board 315 can be installed or removed through connections between the LED light board 315 and the housing 314; design of the slide grooves helps to accurately position the LED light board 315, ensuring stability of the LED light board 315 in the housing 314, while allowing for removal and replacement thereof without damages, without drilling holes or screwing in screws, thereby reducing operation steps; and the LED light board 315 is a conventional LED light strip, which is a well-known technology in the prior art.

In the present embodiment, as a preferred solution, support blocks 322 are provided at positions of the lampshade 32 corresponding to the clamping portions 312; the U-shaped blocks are provided at ends of the support blocks 322; sealing portions of the U-shaped blocks protrude from the support blocks 322 to form the clamping grooves 325 for the clamping portions 312 to be clamped in; openings of the U-shaped blocks are arranged inwardly; each U-shaped block is composed of two guiding inclined panels 321; combinations of the two guiding inclined panels 321 are arranged in arc-shaped surfaces, one of the guiding inclined panels 321 and the lampshade 32 form a clamping groove 325, and the other guiding inclined panel 321 is used to guide a hook-shaped portion 311 to slide into the clamping groove 325; and design of the guiding inclined panels 321 helps guide positions during installation, and design of curved surfaces of the U-shaped blocks can increase accuracy and smoothness of installation; during the assembly process, align the clamping protrusions of the light housing 1 with the clamping grooves 325 of the lampshade 32, and apply appropriate pressure to make the hook-shaped portions 311 of the clamping protrusions slide along guide slopes until the clamping portions 312 are completely embedded in the clamping grooves 325; the hook-shaped portions 311 of the clamping protrusions are in close contact with the inner walls of the clamping grooves 325 to form stable mechanical snap connections, ensuring firm connections between the lampshade 32 and the light housing 1; during disassembly, the other guide inclined panel 321 is used to guide the clamping portion 312 to slide out of the clamping groove 325; the clamping portions 312 are located below free ends of the guide inclined panels; and when the clamping protrusions slide into the clamping grooves 325 and snap into place, the clamping portions 312 can effectively block reverse movements of the clamping protrusions to prevent them from loosening during use.

In the present embodiment, as a preferred solution, the quick release mechanisms 6 comprise insulating pads 61, rotating shafts 62, rotating brackets 63, springs 65, baffles 66, locking bolts 67 and two abutment plates 64; a surface of the housing 314 is provided with protrusions, and end surfaces of the protrusions are slidably connected to the insulating pads 61 through the slide grooves opened along the second direction; a plurality of convex grooves extending along the second direction are provided on inner side walls of the slide grooves; the insulating pads 61 are spaced apart from the surface of the housing 314; the insulating pads 61 are arranged at intervals on the surface of the housing 314; concave patterns matching the convex patterns are provided on the insulating pads 61; the LED light board 315, the surface of the housing 314 and bottom surfaces of the insulating pads 61 are all provided with circular through-holes; ends of the rotating shafts 62 pass through the circular through-holes provided on the LED light board 315, the housing 314 and the insulating pads 61, and are rotatably connected with the LED light board 315, the housing 314 and the insulating pads 61, and the other ends of the rotating shafts 62 at least partially abut against a surface of the LED light board 315;

cross sections of the rotating shafts 62 are waist-shaped; bottom surfaces of the rotating brackets 63 and surfaces of the baffles 66 are both slidably connected to surfaces of the rotating shafts 62 through waist-shaped holes; the springs 65 are sleeved on outside portions of the rotating shafts 62 and ends of the springs 65 abut against the bottom surfaces of the rotating brackets 63; the other ends of the springs 65 abut against the baffles 66; end surfaces of the rotating shafts 62 passing through the baffles 66 are threadedly connected to the locking bolts 67 through threaded holes, and the locking bolts 67 at least partially abut against the baffles 66;

two abutment plates 64 are fixedly connected to the two ends of the rotating brackets 63; two support plates 15 are fixedly connected to an inner side wall of the light housing 1; the two abutment plates 64 abut against upper surfaces of the two support plates 15, respectively;

the insulating pads 61 provide electrical insulation to prevent the rotating brackets 63 from directly contacting the housing 314, avoid short circuits, increase electrical safety, and protect the rotating brackets 63 and the housing 314; the rotating shafts 62 can be quickly disassembled and fixed by rotating; the ends of the rotating shafts 62 pass through and are rotatably connected with the circular through-holes of the LED light board 315, the housing 314, and the insulating pads 61; the other ends of the rotating shafts 62 abut against the surface of the LED light board 315, which is convenient for installation and disassembly, simplifies operation, and saves time; when the rotating shafts 62 are inserted into the circular through-holes of the LED light board 315, the housing 314, and the insulating pads 61, the LED light board 315 can be automatically positioned and fixed, without needs for other components to assist in installation and fixation of the LED light board 315, reducing operation steps, and at the same time, the LED light board 315 can be stably limited;

through connections between the rotating brackets 63 and the rotating shafts 62, rotation of the rotating shafts 62 can drive the rotating brackets 63 to rotate; the cross-sections of the rotating shafts 62 are set in a waist shape, so that the rotating shafts 62 can be slidably connected with the rotating brackets 63 and the baffles 66 through the waist-shaped hole; the baffles 66 can rotate with the rotating shafts 62; through action of the baffles 66, the springs 65 is compressed in cooperation with the rotating brackets 63; forces applied by the springs 65 make the rotating brackets 63 close to the insulating pads 61, thereby increasing frictions between the rotating brackets 63 and the insulating pads 61, and preventing the rotating brackets 63 from rotating easily during operation, causing the quick release mechanisms 6 to loosen and cause the light-emitting member 31 to fall off; and the rotating brackets 63 rotate along with the rotating shafts 62, so that the abutment plates 64 rotate along with the rotating brackets 63, and the abutment plates 64 can abut against the upper surfaces of the support plates 15 through the rotations, thus playing a role in rapid fixation; the support plates 15 do not slide along the first direction against the abutment plates 64 to achieve the purpose of fixation; the connections between the rotating shafts 62 and the locking bolts 67 are used to limit positions of the baffles 66 to avoid the baffles 66 fall off from the rotating shaft 62; at the same time, because the baffles 66 rotate with the rotating shafts 62, the locking bolts 67 are not easy to loosen, providing additional mechanical locking to prevent loosening caused by the vibrations or external forces, and the connections are stable; the simplified quick release and fixation mechanisms significantly reduce the time required for installation and maintenance and improve work efficiency.

In the present embodiment, as a preferred solution, both ends of the rotating brackets 63 are arranged to be inclined along the first direction; the two abutment plates 64 are both arranged in a V-shape on upper edges of the both ends of the rotating brackets 63, and V-shaped bottom surfaces of the two abutment plates 64 are respectively in contact with the upper surfaces of the two support plates 15; and the two ends of the rotating brackets 63 are inclined along the first direction, which can play a compensatory role when rotating; for example, when the rotating brackets 63 rotate, the V-shaped bottom surfaces of the abutting plates 64 are located at one-third of the rotating brackets 63; when the V-shaped bottom surfaces of the abutting plates 64 abut against the upper surfaces of the support plates 15, side surfaces of the support plates 15 are spaced from side surfaces of the rotating brackets 63; If the side surfaces of the rotating brackets 63 are straight edges, the side surfaces of the rotating brackets 63 may contact the side surfaces of the support plates 15 in advance, thereby causing interferences and causing the rotating brackets 63 to be unable to rotate normally to achieve locking and limiting; at the same time, when the V-shaped bottom surfaces of the abutment plates 64 are too low, the two ends of the rotating brackets 63 can be moved closer to middle portions to compensate, thereby improving adaptability of the structure and avoiding the problem that the V-shaped bottom surfaces of the abutment plates 64 cannot be abutted against the upper surfaces of the support plates 15 because the connections cannot be compensated when the rotating brackets 63 are rotating; V-shaped structures of the abutment plates 64 help to evenly distribute forces of the rotating brackets 63 to the support plates 15, increasing stability and load-bearing capacity of the system; the V-shaped structures make contacts between the abutment plates 64 and the support plates 15 closer, improving stability of the connections; at the same time, side portions of the V-shaped structures can play a guiding role during rotation, increasing accuracy and smoothness of installation, increasing overall rigidity of the system, and improving vibration and impact resistance.

In the present embodiment, as a preferred solution, there are two quick release mechanisms 6; the two quick release mechanisms 6 are symmetrically arranged on the housing 314; the abutment plates 64 and the rotating brackets 63 are both made of conductive metal; at least one first contact 16 and at least one second contact 17 are respectively provided on the upper surfaces of the two support plates 15; the two abutment plates 64 on one of the quick release mechanism 6 correspond to the at least one first contact 16 and the at least one second contact 17, so that the at least one first contact 16 and the at least one second contact 17 are connected.

When one of the quick release mechanisms 6 is rotationally locked, the two abutment plates 64 make the at least one first contact 16 communicate with the at least one second contact 17; when one of the quick release mechanisms 6 is rotationally released, the at least one first contact 16 and the at least one second contact 17 are electrically disconnected.

In the present embodiment, as a preferred solution, one end of the light housing 1 is detachably connected with at least one control assembly 4, and the at least one control assembly 4 covers the opening at one end of the light housing 1; at least one electromagnet 41 is provided on the at least one control assembly 4, and the at least one first contact 16 and the at least one second contact 17 are connected in series in a circuit of the at least one electromagnet 41; a fixing end of the first light-emitting unit 2 is made of magnetic material, and the fixing end of the first light-emitting unit 2 is detachably connected to a surface of the control assembly 4 through the at least one electromagnet 41;

When one of the quick release mechanisms 6 is rotationally locked, the two abutment plates 64 make the at least one first contact 16 communicate with the at least one second contact 17, so that the at least one electromagnet 41 is electrified and magnetized, so that the first light-emitting unit 2 can be installed; it is not a locked installation, and the first light-emitting unit 2 can still be disassembled; magnetic forces can play an auxiliary role in fixing; when one of the quick release mechanisms 6 is rotationally released, the at least one first contact 16 and the at least one second contact 17 are electrically disconnected, so that the at least one electromagnet 41 is powered off and demagnetized, making it impossible to install the first light-emitting unit 2;

a purpose is that the first light-emitting unit 2 is installed at the right time; when the first light-emitting unit 2 is not needed, it can be chosen not to be installed and the second light-emitting unit 3 is the main light source; when the first light-emitting unit 2 is needed, the first light-emitting unit 2 is installed to cooperate with the second light-emitting unit 3; and specifically, the fixing end of the first light-emitting unit 2 is an iron bar; the iron bar can be preset for the first light-emitting unit 2 or installed for the first light-emitting unit 2, so as to improve compatibility of the light housing 1 and the first light-emitting unit 2, so that first light-emitting units 2 of different sizes can be installed on the light housing 1 without corresponding threaded holes, so as to avoid the threaded holes opened on the first light-emitting unit 2 and the threaded holes opened on the light housing 1 not matching each other.

In the present embodiment, as a preferred solution, the at least one control assembly 4 comprises at least one mounting plate 42, at least one power supply 43 and at least one control module 44; one end of the light housing 1 is mounted on an outer surface of the at least one mounting plate 42 through grooves; the at least one electromagnet 41 is fixedly connected to an surface of the at least one mounting plate 42; the at least one electromagnet 41 is electrically connected to the at least one power supply 43; the at least one first contact 16 and the at least one second contact 17 are connected in series with a connection between the at least one electromagnet 41 and the at least one power supply 43; the at least one control module 44 is electrically connected to the at least one power supply 43; an input end of a light-emitting end of the first light-emitting unit 2 and an input end of the LED light board 315 are both electrically connected to an output end of the at least one control module 44; and the at least one power supply 43 and the at least one control module 44 are known in the prior art, and are only cited here; the at least one power supply 43 has at least one built-in battery and is provided with at least one charging terminal and at least one output terminal; the at least one built-in battery of the at least one power supply 43 can be charged through the at least one charging terminal and output at the same time; and the at least one built-in battery has a certain capacity and can be used to supply power to the at least one electromagnet 41 when not charged.

In the present embodiment, as a preferred solution, plug blocks 45 are provided at a bottom portion of the at least one mounting plate 42; locking holes 46 cooperating with the plug blocks 45 are provided on the surfaces of the baffles 66; through cooperation between the plug blocks 45 and the locking holes 46, when installing the second light-emitting unit 3, the second light-emitting unit 3 can be directly locked with the rotation of the rotating shafts 62; specifically, after the rotating shafts 62 are connected to pads, the housing 314 is inserted into the light housing 1; at the same time, the at least one mounting plate 42 is placed at the other end of the light housing 1; the plug blocks 45 are inserted into the locking holes 46; when the housing 314 is fixed to the light housing 1 by the rotation of the rotating shafts 62, the at least one mounting plate 42 is locked at the same time; at the same time, through the rotation of the rotating shafts 62, the two abutment plates 64 on one of the rotating brackets 63 make the at least one first contact 16 to be connected with the at least one second contact 17 and the least one electromagnet 41 is energized and magnetic, so that the first light-emitting unit 2 can be installed; and through integration, use of parts is reduced, efficiency of installation and disassembly is effectively improved, costs are reduced, and the use can be facilitated.

Embodiment 2

Figure 11:
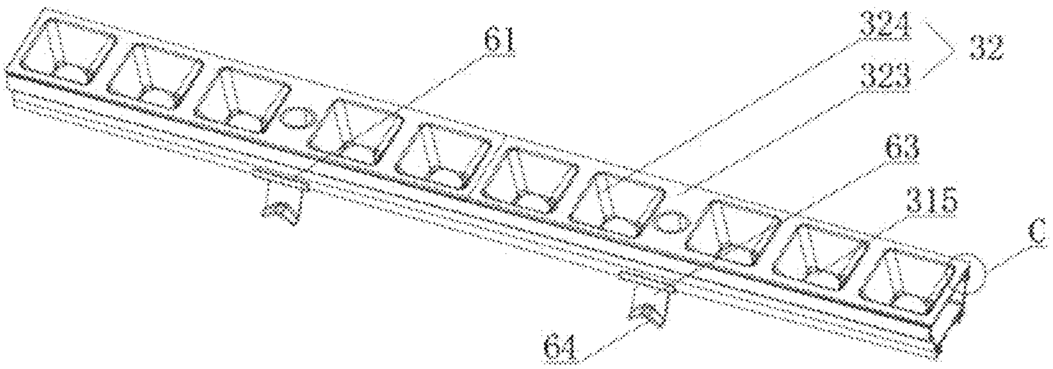
FIG. 11 is a schematic diagram of a three-dimensional structure of a lampshade in the second embodiment of the present invention.
Figure 12:
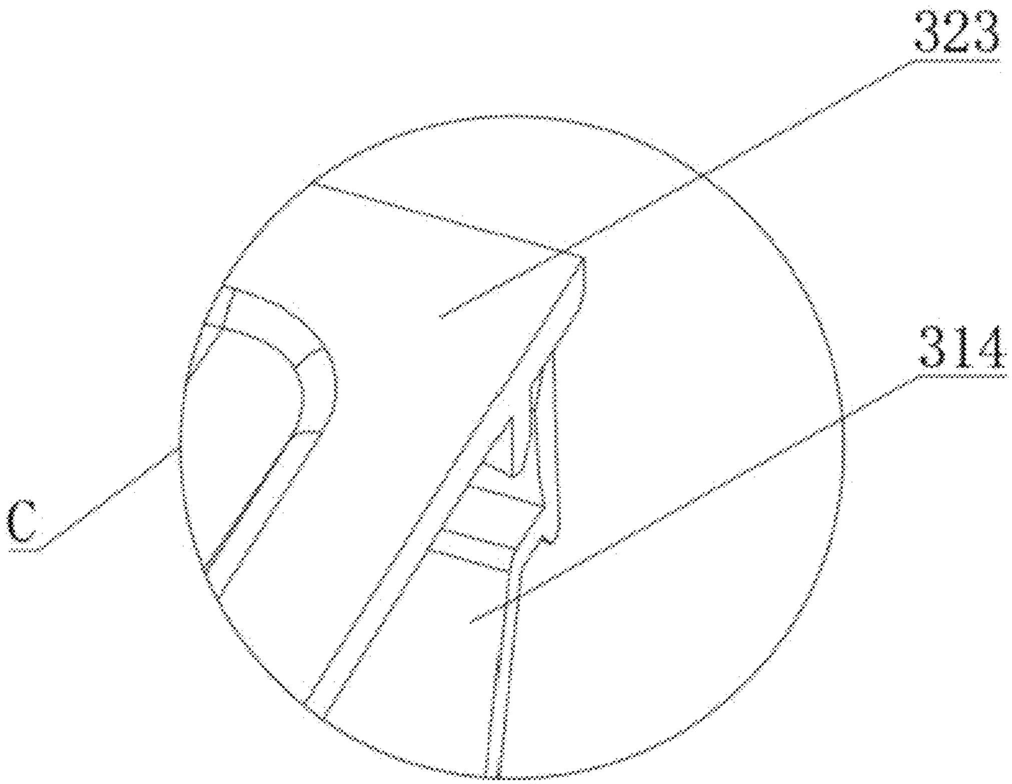
FIG. 12 is an enlarged structural schematic view at the area "C" in FIG. 11 of the present invention.

According to the above embodiment, please refer to FIGS. 11 and 12; the present invention provides a second embodiment, wherein the lampshade 32 comprises a grille plate 323 and light-collecting shells 324; escape openings are provided with a surface of the grille plate 323; ends of the light-collecting shells 324 are fixedly connected to the surface of the grille plate 323 and are located in the housing 314; a diameter of openings of the ends of the light-collecting shells 324 located in the housing 314 is smaller than a diameter of openings of ends shielding the escape openings; a side surface of the grille plate 323 is slidably connected to one end of the housing 314 along the first direction; light beads arranged on the LED light board 315 correspond to the light-collecting shells 324; the openings of the ends of the light-collecting shells 324 located in the housing 314 extend to outside of the light beads; and operation openings corresponding to the rotating shafts 62 are provided on the surface of the grille plate 323;

the grille plate 323 is composed of a plurality of openings to form a grid structure, which can better control light distribution and direction, reduce glare, and reduce reflection by cooperating with the light-collecting shells 324; the grille plate 323 is specifically applied to office desks and design tables to prevent glare from affecting users; at the same time, through the light-collecting shells 324, light will not leak out through the operation openings, thus avoiding light leakage; at the same time, it is possible to insert into the operation openings to rotate the rotating shafts 62, so as to realize rapid disassembly of the housing 314, avoiding steps of first disassembling the lampshade 32 and then disassembling the housing 314; in the above embodiment, the inner end covers 11 need to be lowered along the first direction first, and then the lampshade 32 is disassembled; after another lampshade 32 is clamped on the housing 314, the inner end covers 11 are raised, so that ends of the inner end covers 11 abut against the surface of the replaced lampshade 32; and at the same time, the grille plate 323 is connected to the housing 314; the grille plate 323 and the housing 314 are not clamped, but are directly connected; surfaces of the grille plate 323 and the housing 314 corresponding to each other are both arranged in end slopes; when the grille plate 323 is connected to the housing 314 by direct plugging, the two are connected by interference fit, and there are certain frictions between the grille plate 323 and the housing 314 to prevent the grille plate 323 from being separated from the housing 314; at the same time, the ends of the inner end covers 11 are in contact with the grille plate 323, which can play an auxiliary fixing role to prevent the grille plate 323 from accidentally falling off during operation; when the inner end covers 11 rise with the grille plate 323, the grille plate 323 can be directly fixed on the housing 314, which improves the efficiency of installation and reduces the steps of installation; the grille plate 323 is fixed by the inner end covers 11 and the magnets 12 and a length of the grille plate 323 is suitable for clamping forces of the two inner end covers 11 to ensure that the grille plate 323 does not fall during operation; moreover, through action of the magnets 12, the grille plate 323 can be used for a long time to avoid service life of other clamping parts being affected by wear and tear, and ensure that the grille plate 323 is clamped and fixed for a long time. When the grille plate 323 falls, it can be reset by pushing it. The magnets 12 can also be replaced, which is convenient, efficient and has low maintenance costs.

Although the embodiments of the present invention have been shown and described, it will be appreciated by those skilled in the art that various changes, modifications, substitutions and variations may be made to the embodiments without departing from the principles and spirit of the present invention. The protective scope of the present invention is defined by the appended claims and their equivalents.

The invention claimed is:

1. An LED linear light capable of emitting light on both sides, comprising a light housing (1) with openings at two ends along a first direction; a first light-emitting unit (2) is detachably connected to an opening at one end of the light housing (1); and a second light-emitting unit (3) is installed on an opening at the other end of the light housing (1);

the second light-emitting unit (3) comprises a light-emitting member (31) and a lampshade (32) sequentially arranged in a direction away from the opening of the other end of the light housing (1); the light-emitting member (31) comprises two hook-shaped portions (311) extending outside the light housing (1); sealing grooves (313) are formed on outer wall surfaces of the hook-shaped portions (311); lower edges of the light housing (1) are in contact with walls of the sealing grooves (313); inner wall surfaces of the hook-shaped portions (311) extend inward to form clamping portions (312); and the lampshade (32) comprises clamping grooves (325) corresponding to the clamping portions (312); a width of the clamping grooves (325) along the first direction is greater than a width of the clamping portions (312); a plurality of L-shaped inner end covers (11) are installed at both ends of the light housing (1) along a second direction, and the inner end covers (11) are slidably connected to the light housing (1) along the first direction, so that a cover body of the lampshade (32) can move in a direction close to the light housing (1) and abuts against the clamping portions (312);

wherein the first direction comprises a longitudinal direction of the light housing (1), and the second direction comprises a height direction of the light housing (1);

a plurality of magnets (12) are disposed between the inner end covers (11) and inner end surfaces of the light housing (1); ends of the inner end covers (11) are in contact with a surface of the lampshade (32); bending parts of the inner end covers (11) contact end surfaces of the lampshade (32) and a housing (314);

the LED linear light is configured such that during embedding the lampshade (32), edges of the clamping grooves (325) can push the clamping portions (312) outward, so that the clamping portions (312) are clamped into the clamping grooves (325); during a process of the inner end covers (11) pushing the lampshade (32), the clamping grooves (325) on the lampshade (32) synchronously push the clamping portions (312), and then act on the hook-shaped portions (311), so that the hook-shaped portions (311) are deformed in a direction of the light housing (1), the walls of the sealing grooves (313) are also deformed synchronously, so that the lower edges of the light housing (1) can fit tightly with the walls of the sealing grooves (313).

2. The LED linear light capable of emitting light on both sides according to claim 1, wherein the light-emitting member (31) comprises the housing (314) and an LED light board (315); the housing (314) is detachably connected to the light housing (1) through quick release mechanisms (6); an end surface of the housing (314) is detachably connected to the LED light board (315) through slide grooves; and the hook-shaped portions (311) are provided on the housing (314).

3. The LED linear light capable of emitting light on both sides according to claim 2, wherein a plurality of support blocks (322) are provided at positions of the lampshade (32) corresponding to the clamping portions (312); U-shaped blocks are provided at ends of the support blocks (322); sealing portions of the U-shaped blocks protrude from the support blocks (322) to form the clamping grooves (325) for the clamping portions (312) to be clamped in, wherein the openings of the U-shaped blocks face inward; each U-shaped block is composed of two guiding inclined panels (321); combinations of the two guiding inclined panels (321) are arranged in arc-shaped surfaces; one of the guiding inclined panels (321) and the lampshade (32) form a clamping groove (325); and the other guiding inclined panel (321) is used to guide a hook-shaped portion (311) to slide into a clamping groove (325).

4. The LED linear light capable of emitting light on both sides according to claim 2, wherein the quick release mechanisms (6) comprise insulating pads (61), rotating shafts (63), rotating brackets (63), springs (65), baffles (66), locking bolts (67) and two abutment plates (64); protrusions are provided on a surface of the housing (314), and end surfaces of the protrusions are slidably connected to the insulating pads (61) through the slide grooves opened along the second direction; a plurality of convex grooves extending along the second direction are provided on inner side walls of the slide grooves; the insulating pads (61) are spaced apart from the surface of the housing (314); the insulating pads (61) are arranged at intervals on the surface of the housing (314); concave patterns matching the convex patterns are provided on the insulating pads (61); the LED light board (315), the surface of the housing (314) and bottom surfaces of the insulating pads (61) are all provided with circular through-holes; ends of the rotating shafts (62) pass through the circular through-holes provided on the LED light board (315), the housing (314) and the insulating pads (61), and are rotatably connected with the LED light board (315), the housing (314) and the insulating pads (61), and the other ends of the rotating shafts (62) at least partially abut against a surface of the LED light board (315);

cross sections of the rotating shafts (62) are waist-shaped; bottom surfaces of the rotating brackets (63) and surfaces of the baffles (66) are both slidably connected to surfaces of the rotating shafts (62) through waist-shaped holes; the springs (65) are sleeved on outside portions of the rotating shafts (62) and ends of the springs (65) abut against the bottom surfaces of the rotating brackets (63); other ends of the springs (65) abut against the baffles (66); end surfaces of the rotating shafts (62) passing through the baffles (66) are threadedly connected to the locking bolts (67) through threaded holes, and the locking bolts (67) at least partially abut against the baffles (66); and two abutment plates (64) are fixedly connected to the two ends of the rotating brackets (63); two support plates (15) are fixedly connected to an inner side wall of the light housing (1); the two abutment plates (64) abut against upper surfaces of the two support plates (15), respectively.

5. The LED linear light capable of emitting light on both sides according to claim 4, wherein both ends of the rotating brackets (63) are arranged to be inclined along the first direction; the two abutment plates (64) are both arranged in a V-shape on upper edges of the both ends of the rotating brackets (63); and V-shaped bottom surfaces of the two abutment plates (64) are respectively in contact with the upper surfaces of the two support plates (15).

6. The LED linear light capable of emitting light on both sides according to claim 5, wherein there are two quick release mechanisms (6); the two quick release mechanisms (6) are symmetrically arranged on the housing (314); the abutment plates (64) and the rotating brackets (63) are both made of conductive metal; at least one first contact (16) and at least one second contact (17) are respectively provided on the upper surfaces of the two support plates (15); and the two abutment plates (64) on one of the quick release mechanisms (6) correspond to the at least one first contact (16) and the at least one second contact (17), so that the at least one first contact (16) and the at least one second contact (17) are connected.

7. The LED linear light capable of emitting light on both sides according to claim 6, wherein at least one control assembly (4) is detachably connected with one end of the light housing (1), and the at least one control assembly (4) covers the opening at one end of the light housing (1); at least one electromagnet (41) is provided on the at least one control assembly (4), and the at least one first contact (16) and the at least one second contact (17) are connected in series in a circuit of the at least one electromagnet (41); a fixing end of the first light-emitting unit (2) is made of magnetic material; and the fixing end of the first light-emitting unit (2) is detachably connected to a surface of the control assembly (4) through the at least one electromagnet (41).

8. The LED linear light capable of emitting light on both sides according to claim 7, wherein the at least one control assembly (4) comprises at least one mounting plate (42), at least one power supply (43) and at least one control module (44); one end of the light housing (1) is mounted on an outer surface of the at least one mounting plate (42) through grooves; the at least one electromagnet (41) is fixedly connected to an surface of the at least one mounting plate (42); the at least one electromagnet (41) is electrically connected to the at least one power supply (43); the at least one first contact (16) and the at least one second contact (17)

are connected in series with a connection between the at least one electromagnet (41) and the at least one power supply (43); the at least one control module (44) is electrically connected to the at least one power supply (43); an input end of a light-emitting end of the first light-emitting unit (2); and an input end of the LED light board (315) are both electrically connected to an output end of the at least one control module (44).

9. The LED linear light capable of emitting light on both sides according to claim 8, wherein plug blocks (45) are provided at a bottom portion of the at least one mounting plate (42); and locking holes (46) cooperating with the plug blocks (45) are provided on the surfaces of the baffles (66).

10. The LED linear light capable of emitting light on both sides according to claim 4, wherein the lampshade (32) comprises a grille plate (323) and light-collecting shells (324); escape openings are provided with a surface of the grille plate (323); ends of the light-collecting shells (324) are fixedly connected to the surface of the grille plate (323) and are located in the housing (314); a diameter of openings of the ends of the light-collecting shells (324) located in the housing (314) is smaller than a diameter of openings of ends shielding the escape openings; a side surface of the grille plate (323) is slidably connected to one end of the housing (314) along the first direction; light beads arranged on the LED light board (315) correspond to the light-collecting shells (324); the openings of the ends of the light-collecting shells (324) located in the housing (314) extend to outside of the light beads; and operation openings corresponding to the rotating shafts (62) are provided on the surface of the grille plate (323).

* * * * *